(12) United States Patent
Giobbi

(10) Patent No.: US 7,472,280 B2
(45) Date of Patent: Dec. 30, 2008

(54) DIGITAL RIGHTS MANAGEMENT

(75) Inventor: John J. Giobbi, Northbrook, IL (US)

(73) Assignee: Proxense, LLC, Bend, OR (US)

( * ) Notice: Subject to any disclaimer, the term of this patent is extended or adjusted under 35 U.S.C. 154(b) by 729 days.

(21) Appl. No.: 10/153,979

(22) Filed: May 23, 2002

(65) Prior Publication Data

US 2002/0144116 A1 Oct. 3, 2002

Related U.S. Application Data

(63) Continuation-in-part of application No. 10/016,857, filed on Dec. 14, 2001, now abandoned, and a continuation-in-part of application No. 09/750,487, filed on Dec. 27, 2000, now abandoned.

(51) Int. Cl.
*H04L 9/00* (2006.01)
(52) U.S. Cl. .................. 713/182; 713/185; 713/155; 726/26; 380/223; 380/247
(58) Field of Classification Search ............ 713/185, 713/193, 169, 168, 151, 155, 182; 705/51, 705/59; 380/277, 45, 247, 202, 223; 726/9, 726/26
See application file for complete search history.

(56) References Cited

U.S. PATENT DOCUMENTS

| | | | |
|---|---|---|---|
| 4,759,060 A | 7/1988 | Hayashi et al. | |
| 5,187,352 A | 2/1993 | Blair et al. | |
| 5,296,641 A | 3/1994 | Stelzl | |
| 5,392,433 A | 2/1995 | Hammersley et al. | |
| 5,422,632 A * | 6/1995 | Bucholtz et al. | 340/5.24 |
| 5,450,489 A | 9/1995 | Ostrover et al. | 380/3 |
| 5,619,251 A | 4/1997 | Kuroiwa et al. | |
| 5,629,980 A | 5/1997 | Stefik et al. | |
| 5,644,354 A | 7/1997 | Thompson et al. | |

(Continued)

FOREIGN PATENT DOCUMENTS

WO WO00/62505 10/2000

(Continued)

OTHER PUBLICATIONS

Brochure, "Bluetooth," www.bluetooth.com, Printed Jun. 1, 2000.

(Continued)

*Primary Examiner*—Nasser Moazzami
*Assistant Examiner*—Shanto M Abedin
(74) *Attorney, Agent, or Firm*—Fenwick & West LLP

(57) ABSTRACT

A method of managing digital rights comprises the following steps. First, a physical electronic key containing a first activation code is provided to a requesting user. Second, locked digital content is provided to the requesting user. The digital content is encoded with a second activation code associated with the first activation code. Third, the locked digital content is received in a playing device that reads the first activation code and determines whether the first activation code is associated with the second activation code. Fourth, the playing device is enabled to unlock and play the digital content if the first activation code is associated with the second activation code. A digital right management system for implementing the foregoing method is also disclosed.

18 Claims, 8 Drawing Sheets

U.S. PATENT DOCUMENTS

| | | | |
|---|---|---|---|
| 5,666,412 A | 9/1997 | Handelman et al. | |
| 5,784,464 A | 7/1998 | Akiyama et al. | 380/25 |
| 5,825,876 A | 10/1998 | Peterson, Jr. | 380/4 |
| 5,857,020 A | 1/1999 | Peterson, Jr. | |
| 5,892,825 A | 4/1999 | Mages et al. | 380/3 |
| 5,898,880 A | 4/1999 | Ryu | |
| 5,928,327 A | 7/1999 | Wang et al. | |
| 5,991,399 A * | 11/1999 | Graunke et al. | 380/279 |
| 5,991,749 A | 11/1999 | Morril, Jr. | |
| 6,035,038 A | 3/2000 | Campinos et al. | 380/16 |
| 6,035,329 A | 3/2000 | Mages et al. | 709/217 |
| 6,041,410 A | 3/2000 | Hsu et al. | |
| 6,055,314 A * | 4/2000 | Spies et al. | 380/228 |
| 6,088,730 A | 7/2000 | Kato et al. | |
| 6,104,334 A | 8/2000 | Allport | |
| 6,148,142 A | 11/2000 | Anderson | |
| 6,161,179 A | 12/2000 | Seidel | |
| 6,209,089 B1 | 3/2001 | Selitrennikoff et al. | |
| 6,219,109 B1 | 4/2001 | Raynesford et al. | 348/734 |
| 6,247,130 B1 | 6/2001 | Fritsch | 713/171 |
| 6,266,415 B1 | 7/2001 | Campinos et al. | 380/247 |
| 6,295,057 B1 | 9/2001 | Rosin et al. | |
| 6,336,121 B1 | 1/2002 | Lyson et al. | 707/201 |
| 6,336,142 B1 | 1/2002 | Kato et al. | |
| 6,367,019 B1 | 4/2002 | Ansell et al. | |
| 6,381,747 B1 | 4/2002 | Wonfor et al. | |
| 6,385,596 B1 * | 5/2002 | Wiser et al. | 705/51 |
| 6,392,664 B1 | 5/2002 | White et al. | |
| 6,397,387 B1 | 5/2002 | Rosin et al. | |
| 6,401,059 B1 | 6/2002 | Shen et al. | |
| 6,411,307 B1 | 6/2002 | Rosin et al. | |
| 6,424,715 B1 | 7/2002 | Saito | |
| 6,425,084 B1 * | 7/2002 | Rallis et al. | 713/185 |
| 6,434,535 B1 | 8/2002 | Kupka et al. | |
| 6,446,130 B1 | 9/2002 | Grapes | |
| 6,463,534 B1 * | 10/2002 | Geiger et al. | 713/168 |
| 6,480,188 B1 | 11/2002 | Horsley | |
| 6,490,443 B1 | 12/2002 | Freeny, Jr. | |
| 6,510,350 B1 | 1/2003 | Steen et al. | |
| 6,523,113 B1 * | 2/2003 | Wehrenberg | 713/176 |
| 6,529,949 B1 | 3/2003 | Getsin et al. | |
| 6,546,418 B2 | 4/2003 | Schena et al. | |
| 6,550,011 B1 * | 4/2003 | Sims, III | 713/193 |
| 6,563,805 B1 | 5/2003 | Ma et al. | |
| 6,564,380 B1 | 5/2003 | Murphy | |
| 6,628,302 B2 | 9/2003 | White et al. | |
| 6,632,992 B2 | 10/2003 | Hasegawa | |
| 6,647,417 B1 | 11/2003 | Hunter et al. | |
| 6,667,684 B1 | 12/2003 | Waggamon et al. | |
| 6,683,954 B1 * | 1/2004 | Searle | 380/30 |
| 6,697,944 B1 * | 2/2004 | Jones et al. | 713/168 |
| 6,711,464 B1 | 3/2004 | Yap et al. | |
| 6,775,655 B1 * | 8/2004 | Peinado et al. | 705/59 |
| 6,804,825 B1 | 10/2004 | White et al. | |
| 6,806,887 B2 | 10/2004 | Chernock et al. | |
| 6,873,975 B1 * | 3/2005 | Hatakeyama et al. | 705/51 |
| 6,950,941 B1 * | 9/2005 | Lee et al. | 713/193 |
| 6,975,202 B1 * | 12/2005 | Rodriguez et al. | 340/5.25 |
| 7,012,503 B2 * | 3/2006 | Nielsen | 340/5.6 |
| 2002/0007456 A1 * | 1/2002 | Peinado et al. | 713/164 |
| 2002/0013772 A1 * | 1/2002 | Peinado | 705/51 |
| 2002/0015494 A1 * | 2/2002 | Nagai et al. | 380/201 |
| 2002/0026424 A1 * | 2/2002 | Akashi | 705/57 |
| 2002/0073042 A1 | 6/2002 | Maritzen et al. | |
| 2002/0108049 A1 * | 8/2002 | Xu et al. | 713/193 |
| 2002/0109580 A1 | 8/2002 | Shreve et al. | |
| 2003/0055689 A1 | 3/2003 | Block et al. | |
| 2004/0129787 A1 | 7/2004 | Saito et al. | |

FOREIGN PATENT DOCUMENTS

| | | |
|---|---|---|
| WO | WO01/22724 | 3/2001 |
| WO | WO01/75876 | 10/2001 |
| WO | WO01/77790 | 10/2001 |
| WO | WO 2005/050450 A1 | 6/2005 |
| WO | WO 2005/086802 A2 | 9/2005 |

OTHER PUBLICATIONS

Article, "Bluetooth, The King of Connectivity," *Laptop Buyer's Guide and Handbook*, pp. 148-153, Jan. 2000.

Article, "Digital Rights Management May Solve the Napster 'Problem'," *Technology Investor*, pp. 24-27, Oct. 2000.

Article, "Downloading for Dollars," *Sound & Vision*, pp. 137-138, Nov. 2000.

Article, "In the Age of Napster, Protecting Copyright is a Digital Arms Race," *Wall Street Journal*, Jul. 25, 2000.

Article, "Sound Waves Could Help Ease Web-Fraud Woes," *Wall Street Journal*, Aug. 14, 2000.

Press Release, "Micronas and Thomson multimedia Showcase a New Copy Protection System That Will Drive the Future of Digital Television," www.micronas.com, Jan. 8, 2002.

Press Release, "Content protection plan targets wireless home networks," www.eetimes.com, Jan. 11, 2002.

Press Release, "Thomson Bets On Smart Cards For Video Encryption," www.informationweek.com, Jun. 7, 2001.

Press Release, "Thomson multimedia unveils copy protection proposal designed to provide additional layer of digital content security," www.thomson-multimedia.com, May 30, 2001.

Michael Antonoff, "Visiting Video Valley", *Sound & Vision*, pp. 116 and 118-119, Nov. 2001.

Debow, Credit/Debit Debuts in Midwest Smart Card Test, Computers in Banking, v6, n11, p. 10, Nov. 1989.

Dennis, Digital Passports Need Not Infringe Civil Liberties, Newsbytes, Dec. 2, 1999, 2 pages.

Fasca, Chad, "The Circuit," Electronic News, 45(45), (Nov. 8, 1999), 20.

Firecrest Shows How Truly Commercially-Minded Companies Will Exploit the Internet, Computergram International, Jan. 18, 1996.

Lewis, Sony and Visa in On-Line Entertainment Venture, New York Times, v145, Nov. 16, 1995.

Notification of the International Search Report and Written Opinion, PCT/US04/38124, Apr. 7, 2005, 10 pages.

Paget, Paul, "The Security Behind Secure Extranets," Enterprise Systems Journal, (Dec. 1999), 4 pgs.

"Say Hello to Bluetooth," Bluetooth Web site, 4 pages.

Sapsford, Jathon, "E-Business: Sound Waves Could Help Ease Web-Fraud Woes," Wall Street Journal, (Aug. 14, 2000), B1.

Wallace, Bob, "The Internet Unplugged," InformationWeek, 765(22), (Dec. 13, 1999), 22-24.

Weber, Thomas E., "In the Age of Napster, Protecting Copyright is a Digital Arms Race," Wall Street Journal, (Jul. 24, 2000), B1.

PCT International Search Report and Written Opinion, PCT/US05/43447, Feb. 22, 2007, 7 pages.

PCT International Search Report and Written Opinion, PCT/US05/46843, Mar. 1, 2007, 10 pages.

"Alliance Activities: Publications: Identity- Smart Card Alliance," Smart Card Alliance, 1997-2007, [online] [Retrieved on Jan. 7, 2007] Retrieved from the Internet<URL:http://www.smartcardalliance.org/pages/publications-identity>.

"Applying Biometrics to Door Access," Security Magazine, Sep. 26, 2002 [online] [Retrieved on Jan. 7, 2007] Retrieved from the Internet<URL:http://www.securitymagazine.com/CDA/Articles/Technologies/3ae610eaa34d8010VgnVCM100000f932a8c0__>.

"Frequently Asked Questions (FAQs) About BioPay," BioPay, LLC, 2007, [online] [Retrieved on Jan. 7, 2007] Retrieved from the Internet<URL:http://www.biopay.com/faqs-lowes.asp>.

McIver, R. et al., "Identification and Verification Working Together," Bioscrypt™, Aug. 27, 2004, [online] [Retrieved on Jan. 7, 2007] Retrieved from the Internet<URL:http://www.ibia.org/ membersadmin/whitepapers/pdf/15/Identification%20and%20Verification%20Working%20Together.pdf>.

Nilsson, J. et al., "Match-On-Card for Java Cards," Precise Biometrics, White Paper, Apr. 2004, [online] [Retrieved on Jan. 7, 2007] Retrieved from the Internet<URL:http://www.ibia.org/membersadmin/whitepapers/pdf/17/Precise%20Match-on-Card%20for%20Java%20Cards.pdf>.

Nordin, B., "Match-On-Card Technology," Precise™ Biometrics, White Paper, Apr. 2004, [online] [Retrieved on Jan. 7, 2007] Retrieved from the Internet<URL:http://www.ibia.org/membersadmin/whitepapers/pdf/17/Precise%20Match-on-Card%20technology.pdf>.

"SAFModule™: A Look Into Strong Authentication," saflink Corporation, [online] [Retrieved on Jan. 7, 2007] Retrieved from the Internet<URL:http://www.ibia.org/membersadmin/whitepapers/pdf/6/SAFmod_WP.pdf>.

"Smart Cards and Biometrics White Paper," Smart Card Alliance, May 2002, [online] [Retrieved on Jan. 7, 2007] Retrieved from the Internet<URL:http://www.securitymanagement.com/library/smartcard_faqtech0802.pdf>.

Wade, W., "Using Fingerprints to Make Payments at POS Slowly Gaining Popularity," Credit Union Journal, International Biometric Group, Apr. 21, 2003, [online] [Retrieved on Jan. 7, 2007] Retrieved from the Internet<URL:http://www.biometricgroup.com/in_the_news/04.21.03.html>.

* cited by examiner

DIGITAL RIGHTS MANAGEMENT

REFERENCE TO RELATED APPLICATIONS

This application is a continuation-in-part of U.S. patent application Ser. No. 09/750,487 filed Dec. 27, 2000 now abandoned and Ser. No. 10/016,857 filed Dec. 14, 2001 now abandoned, each of which is hereby incorporated by reference.

FIELD OF THE INVENTION

The present invention relates generally to digital rights management and, more particularly, to a digital rights management system and method that effectively balances and protects the rights of both a consumer and a provider of digital content, such as music, video, and software.

BACKGROUND OF THE INVENTION

The market for downloading digital content online is rapidly climbing because distribution of such content is inexpensive, fast, and easy and the quality of the content itself is acceptable. The market, however, remains disorganized due to competing standards, competing companies, discontented artists and producers, and outright theft of digital content.

Digital rights management (DRM) companies seek to solve the foregoing problems by delivering the digital content from the real producers to the right customers and ensuring that everyone who should be paid in fact is paid. DRM seeks to get everyone paid by managing the multiple steps for distributing digital content (music, video, software) online: watermarking, encryption, transaction management, and rights management. Some DRM companies perform all these steps, while other DRM companies specialize in one or two steps of the process.

First, watermarking stamps each piece of digital content with a digital mark so it can be tracked wherever it goes. Digital watermarks are just like paper watermarks, except they cannot be seen or heard. Special software is required to read a digital watermark.

Second, encryption scrambles watermarked digital content and stores it inside a digital safe for shipment around the Internet. The safe protects the content during shipping by allowing only those with the right software key to the safe to decrypt and use the content.

Third, transaction management handles actual payments for the digital content using credit card techniques found elsewhere in e-commerce. An order is placed, a credit card number is taken, account status is checked, and the exchange is authorized.

Finally, rights management manages the information about the digital content itself: what it is, who gets it, how it is delivered, how many times it may be used, how long the rights last, who gets paid, how much they get paid, and how. This information travels with the digital content in something called a digital permit. The permits rests on top of the digital content as it travels the Internet and allows legal users to enjoy the digital content for as long as the rights last.

The primary objective of DRM companies is to deploy technologies that protect digital content as it is distributed online. Some of these proposed technologies and DRM in general are discussed in the article "Digital Rights Management May Solve the Napster 'Problem'," *Technology Investor*, October 2000, pp. 24-27. Although such technologies should reduce the amount of digital theft, they generally favor the content provider at the expense of the consumer or favor the consumer at the expense of the content provider. That is, the rights of either the content provider or the consumer are compromised. For example, some technologies severely limit the consumer's ability to make extra copies of digital content even when the digital content is solely for personal use. Other technologies facilitate the making of copies of digital content which can be used by different consumers without the content provider being compensated by each consumer. The present inventor has discovered an improved DRM system and method that effectively balances and protects the rights of both the consumer and the content provider.

SUMMARY OF THE INVENTION

The present invention employs a portable, physical electronic key or data unit that is personal to a particular user. The physical key is permanently associated with a user's digital content library. The digital content in the user's library may be acquired by different methods, such as downloading, broadcast, or store-bought. At the time of content acquisition, the content is encrypted and the physical key becomes permanently associated with the newly acquired content. The user is now "linked" to that acquired content. A user (e.g., individual or family) may own as many physical keys as desired, but every piece of encrypted digital content purchased is tied to one specific key. The user may duplicate or transfer the acquired content to any media or device for playback as many times as desired, as long as the associated physical key is present. The playback device reads the physical key and the digital content and, if the device determines that they are associated, the device decrypts and plays the digital content. Thus, the present invention guarantees that the acquired content is played only by the user who has legitimately paid for it. The present invention gives consumers unprecedented freedoms and conveniences to use legitimately purchased content while still fully protecting content providers' rights.

BRIEF DESCRIPTION OF THE DRAWINGS

The foregoing and other advantages of the invention will become apparent upon reading the following detailed description and upon reference to the drawings in which.

Figure 1:
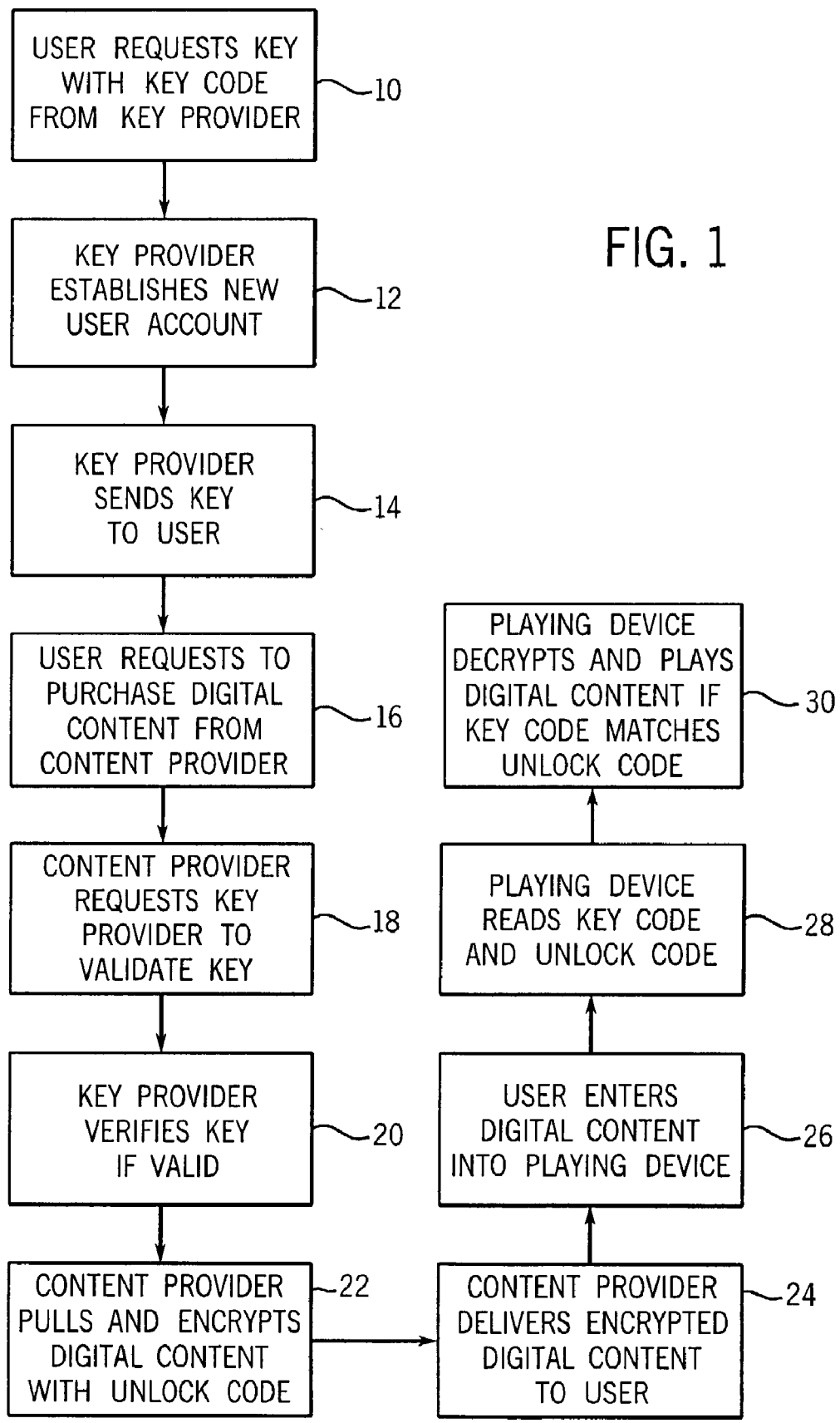
FIG. 1 is a flow chart of a method of managing digital rights in accordance with the present invention.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents, and alternatives falling within the spirit and scope of the invention as defined by the appended claims.

DESCRIPTION OF SPECIFIC EMBODIMENTS

Turning now to the drawings and referring initially to FIG. 1, there is depicted a method of managing digital rights in accordance with the present invention. First, a new user requests a physical electronic key or data unit from a key provider (step 10). The key provider may offer a web site on the Internet, a toll free telephone number, and/or retail outlet where the key may be acquired. In addition, the key provider may allow a key to be requested in writing, preferably using a form designed by the key provider. In one model the user may acquire as many keys as desired, while in another model each user is only entitled to a single key.

Second, in response to the user's request for a physical key, the key provider establishes a new secure account for that new user in a secure user account database (step 12). The new account may include the following data fields: account number, password, software encryption key, user label, number of users (linked to account), address, telephone number, e-mail address, and custom fields. The custom fields may, for example, include demographic information such as the user's age, gender, marital status, income level, interests, hobbies, etc. The physical key may include the following data fields: user label, account number, software decryption key, and a custom storage area. The user label and the account number serve as a first activation code (or key code) for the acquired physical key. All data fields on the physical key, except for the user label, are preferably encrypted. To allow the user to view his or her account in the future, the user is preferably assigned a login name and the above-noted password.

Third, the key provider ships the physical electronic key to the new user via a package courier such as the U.S. Postal Service, United Parcel Service, or Federal Express (step 14). In one pricing model the physical key is sent to the user at no charge, while in another pricing model the physical key must be purchased by the user. If the physical key must be purchased by the user, either the user must provide credit/debit card information to the key provider in step 10 to pay with a credit/debit card, or the key provider includes an invoice with the shipped key in step 14.

Figure 2:
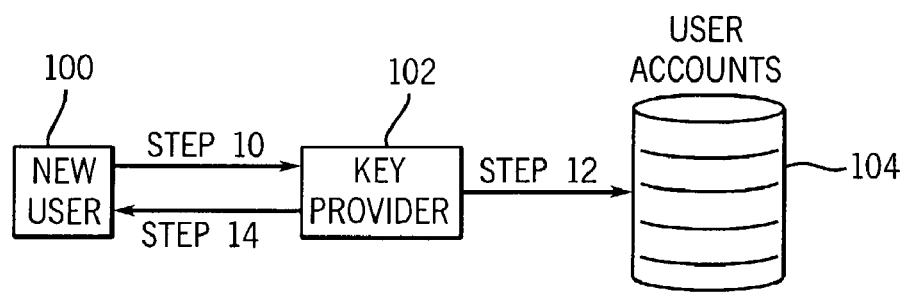
FIGS. 2, 3, and 4 are block diagrams of portions of a DRM system for implementing the method in FIG. 1.

FIG. 2 is a block diagram of a system for implementing steps 10, 12, and 14 of the method of managing digital rights. The system includes the new user 100, the key provider's web site 102, and the user account database 104.

Referring back to FIG. 1, fourth, the user transmits his or her activation code in the physical key to a digital content provider, who may have a cooperative relationship with the key provider, and requests to purchase digital content (music, video, or software) from that content provider (step 16). The content provider may offer a web site on the Internet containing a listing of digital content available for purchase. To transmit the activation code to the content provider via the web site, the user may manually enter the activation code onto a secure page of the web site. Alternatively, the transmission of the activation code may be automatically implemented with wireless technology. Specifically, the user's computer may be outfitted with a detector that detects the activation code in the user's physical key and then relays the activation code to the content provider via the web site. The content provider may be affiliated with the key provider or may be separate from the key provider but have an arrangement therewith.

Fifth, the content provider requests the key provider to verify the activation code transmitted by the user (step 18). The content provider may send this request to the key provider's web site. Sixth, the key provider in turn accesses the user's account in the user account database and determines whether the activation code is in fact valid (step 20). The key provider may also determine whether the activation code is associated with the user that transmitted the activation code to the content provider. If the activation code is rejected as being invalid, the content provider is so informed and the content provider in turn will not honor any request by the user to purchase digital content. If, however, the activation code is accepted as being valid, the content provider is so informed and the purchase transaction proceeds. As used herein, the term "key provider" generically refers to the entity or entities that manufacture, distribute, and validate the physical keys. These functions may actually be performed by multiple entities at different locations or by a single entity at a single location.

Seventh, after securing validation of the first activation code in the physical key, the content provider pulls the requested digital content from a digital content database/library, marks the digital content with a second activation code (or unlock code) associated with the first activation code in the physical key, and encrypts the marked digital content (step 22). The second activation code in the digital content may simply be the same as the first activation code in the physical key, but at least partially encrypted for security. In one embodiment, the "key-secured" content file includes the following data fields: user label, account number, and digital content. The user label and the account number serve as the second activation code for the digital content. If the content is merely for sampling (described in connection with FIG. 6), the file may include such additional data fields as a receiver/decoder circuit identification number, hour stamp, and life hours. All data fields on the content file, except for the user label, are preferably encrypted.

Eighth, the content provider delivers the encrypted digital content to the user (step 24). The encrypted digital content may be delivered by downloading the encrypted digital content to the user's computer while the user is online at the content provider's web site, by attaching the digital content to an e-mail addressed to the user, or by shipping a disk containing the encrypted digital content to the user via a package courier. The user may pay for the digital content either by providing credit/debit card information to the content provider in step 16 or by paying off of an invoice included with delivered digital content. If the digital content is delivered online, the user is preferably required to provide the credit/debit card information and have such information approved as a prerequisite to delivery of the digital content. If the user possesses more than one physical electronic key and would like the acquired digital content to function with each of the user's keys, all of the activation codes are applied to the digital content. The content provider charges the user based on the number of keys with which the user would like the digital content to function. For example, the user may be charged the same amount for each activation code, or may be charged a larger amount for one activation code and lesser amounts (e.g., surcharges) for additional activation codes.

Figure 3:
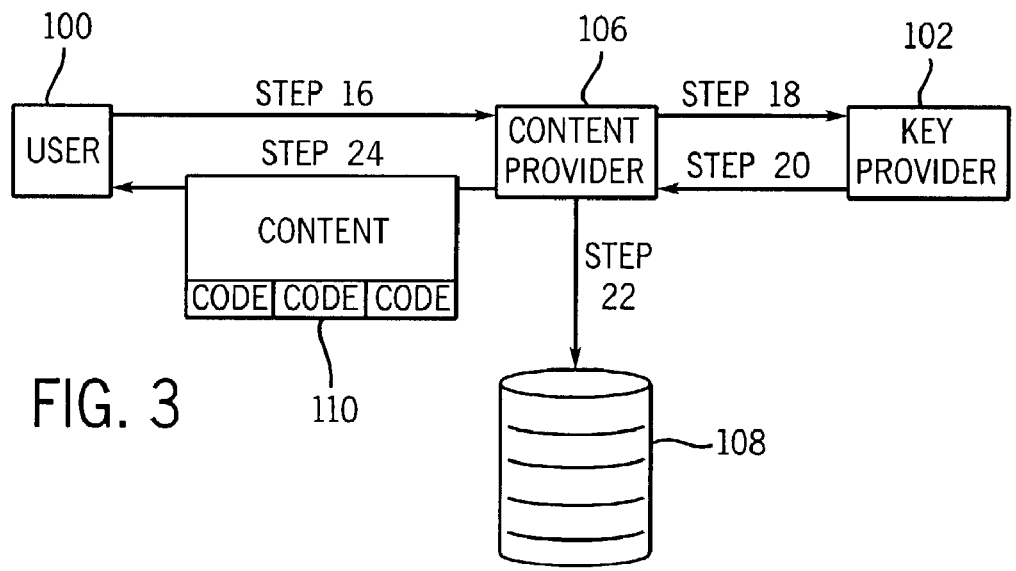

FIG. 3 is a block diagram of a system for implementing steps 16, 18, 20, 22, and 24 of the method of managing digital rights. The system includes the new user 100, the content provider 106, the key provider's web site 102, the digital content database 108, and the acquired digital content 110.

Returning to FIG. 1, ninth, the user enters the encrypted digital content into a playing device of a type suitable for playing the digital content (step 26). The device may, for example, be an MP3 player, a personal computer, a DVD player, a CD player, a cellular phone, or other portable device. In one embodiment, the device contains a wireless transceiver adapted to receive a radio frequency signal transmitted by a corresponding wireless transceiver in the user's physical electronic key. The wireless transceiver in the device is optionally tracked and "secured" for audit purposes by permanently including a unique identifier assigned by the device manufacturer in the transceiver.

Tenth, with the user's physical electronic key within a short range (e.g., few meters) of the playing device, the playing device reads (1) the first activation code carried in a secure radio frequency signal transmitted by the transceiver in the physical key to the transceiver in the device and (2) the second activation code marked on the encrypted digital content (step 28). The device contains decryption software or hardware for decrypting the encrypted digital content to the extent necessary to read any encrypted portion of the second activation code.

Eleventh, the playing device compares the first activation code and the second activation code and determines whether the first activation code is associated with the second activation code (step 30). Steps 29 and 30 may be performed, for example, when the user presses a "play" button on the playing device or when the user first enters the encrypted digital content into the playing device. If the first activation code is associated with the second activation code, the device decrypts and plays the digital content. If the first activation code is not associated with the second activation code, the device does not play the digital content. If the second activation code is simply the same as the first activation code, then the foregoing comparison determines whether there is a match between the first activation code and the second activation code. In a preferred embodiment, the device continues to play the digital content only while the physical key is sufficiently close to the device to communicate the first activation code to the device and allow the device to compare the first activation code to the second activation code at least partially encrypted with the digital content even while the digital content is being played. If the physical key is moved out of range, the device is no longer enabled to decrypt and play the digital content. In an alternative embodiment, once the device is initially enabled to decrypt and play the digital content, the device remains enabled until either the "play" function is stopped, a play track/song ends, or the digital content is removed from the device, even if the physical key is moved out of range such that the key can no longer communicate the first activation code to the device.

Figure 4:
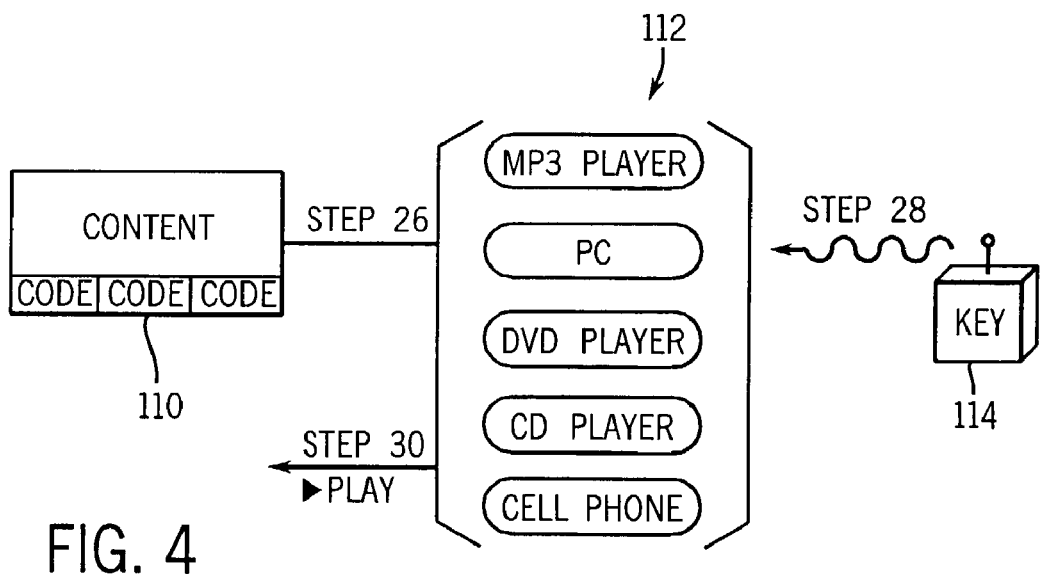

FIG. 4 is a block diagram of a system for implementing steps 26, 28, and 30 of the method of managing digital rights. The system includes the encrypted digital content 110, the key-enabled playing devices 112, and the user's physical electronic key 114.

As stated above, the user's physical electronic key and the key-enabled playing device contain respective wireless transceivers to communicate the activation code in the key to the device. In a preferred embodiment, the transceivers are small, inexpensive Bluetooth radio chips that operate in the unlicensed ISM band at 2.4 GHz and avoid interference from other signals by hopping to a new frequency after transmitting or receiving a packet. The radio chips are plugged into electronic devices, which can then communicate over short distances and through obstacles by means of radio waves. Bluetooth is a term used to describe the protocol of a short range (e.g., about 10 meters) frequency-hopping radio link between devices containing the radio chips. These devices are then termed "Bluetooth-enabled." The secure radio link replaces a cable that would otherwise be used to connect the devices. Further details concerning Bluetooth wireless technology may be obtained from www.bluetooth.com.

Wireless technologies other than Bluetooth may be used to communicate the activation code from the user's physical electronic key to the playing device. One example of an alternative wireless technology is known by a trade term "Wi-Fi," which is short for wireless fidelity and is another name for IEEE 802.11b. Products certified as Wi-Fi by the Wireless Ethernet Compatibility Alliance (WECA) are interoperable with each other even if they are from different manufacturers. A user with a Wi-Fi product can use any brand of access point with any other brand of client hardware that is built to the Wi-Fi standard.

In other alternative embodiments, the communication between the user's physical electronic key and the playing device is not wireless. Rather, in one alternative embodiment, the user's physical electronic key communicates the activation code to the playing device via a transmission line such as a serial cable that plugs into the key at one end and the playing device at the other end. In another alternative embodiment, the key is a smart card or magnetic card into which the activation code is encoded, and the key is configured to physically fit into a card reader slot on the playing device.

The above-described DRM method and system for implementing the method are advantageous in that they afford the key holder with tremendous versatility in copying and using encrypted digital content for personal use. At the same time, the rights of the content provider are protected because only the key holder with a key-enabled device can use the encrypted digital content. The key holder can copy the encrypted digital content as many times as desired, but can only play the encrypted digital content on a key-enabled device that is enabled with the physical electronic key coded to decrypt the encrypted digital content. Thus, the digital content, even when copied, remains personal to the key holder. Individuals other than the key holder cannot use the encrypted digital content, even if they copy it, because both the original and copies of the encrypted digital content are still encrypted and the individuals do not hold the physical electronic key coded to decrypt the digital content.

A core element of the present invention is the concept of a portable, physical electronic key that is personal to a particular user. The physical key represents a DRM solution that fully addresses the needs of both consumers and publishers of digital content. The physical key is permanently associated with a user's digital content library. At the time of content acquisition, the physical key becomes permanently associated with the newly acquired content. The user is now "linked" to that acquired content. A user (e.g., individual or family) may own as many physical keys as desired, but every piece of encrypted digital content purchased is tied to one specific key. The user may duplicate or transfer the acquired content to any media or device for playback as many times as desired, as long as the associated physical key is present. Thus, the present invention guarantees that the acquired content is played only by the user who has legitimately paid for it. The present invention gives consumers unprecedented freedoms and conveniences to use legitimately purchased content while still fully protecting content providers' rights.

Figure 5:
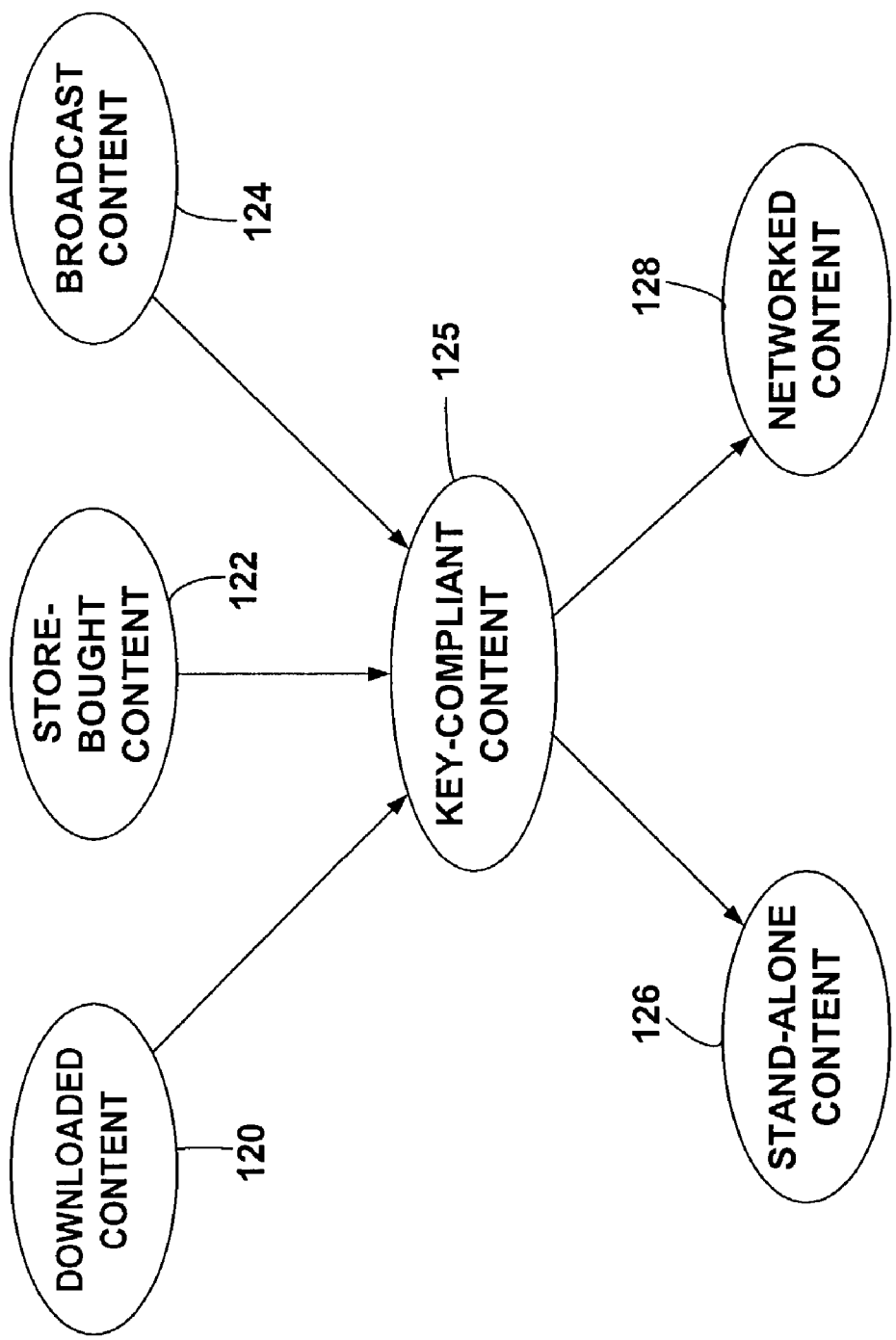
FIG. 5 is a conceptual model of core options for acquiring digital content that can be encoded to produce key-secured content and core options for playing back the key-secured content.

Referring to FIG. 5, the present invention fully supports the use of "keysecured" digital content 125 with all core content acquisition options and all core playback options. The key-secured digital content 125 is encoded with a second activation code associated with a first activation code stored on the user's physical electronic key. The core acquisition options include downloaded content 120, store-bought content 122, and broadcast content 124. The core playback options include stand-alone devices 126 and networked devices 128. Each of these options are described in further detail below.

Figure 6:
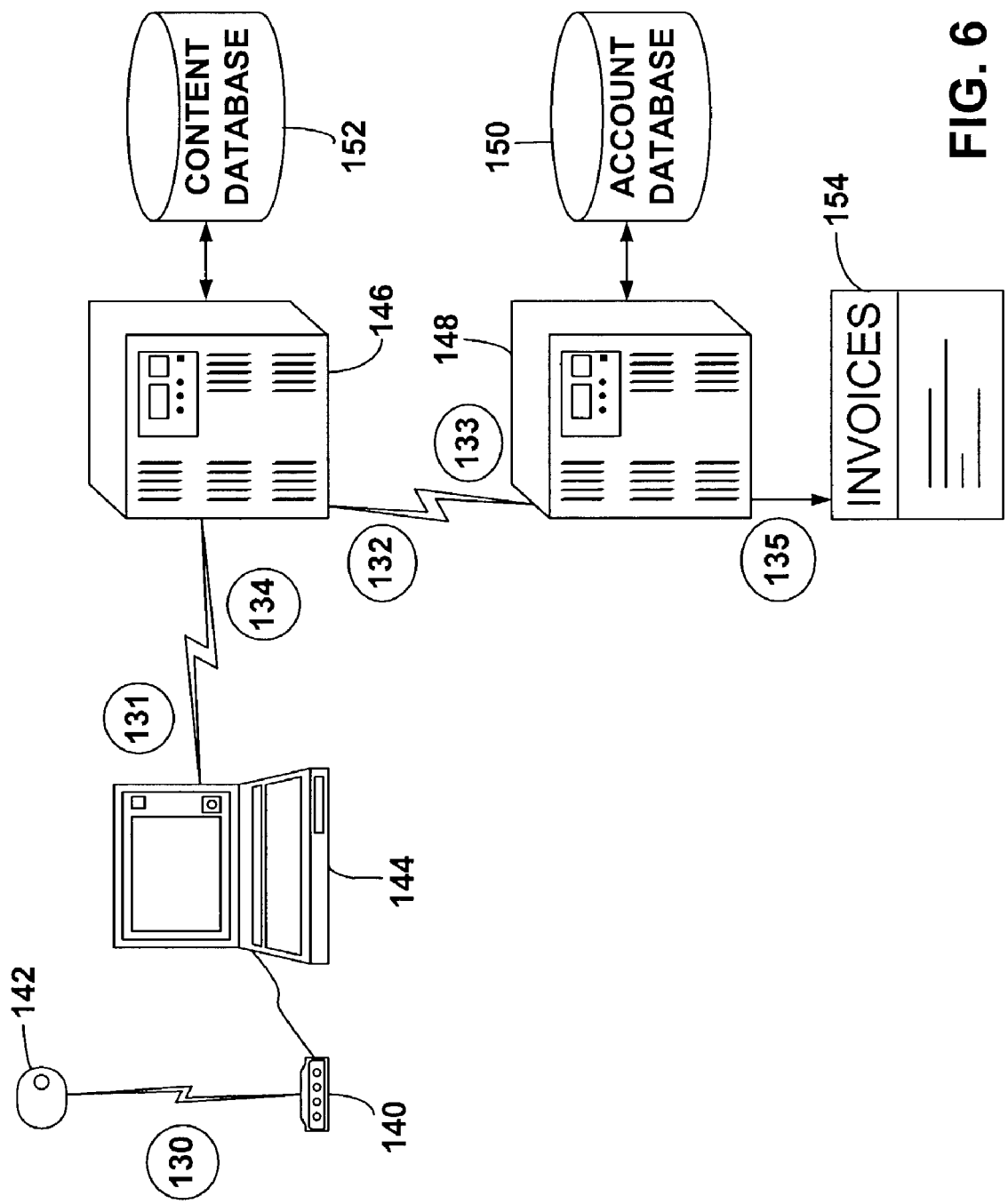
FIG. 6 is a block diagram for implementing a core acquisition option of downloaded content.

Referring to FIG. 6 generally, as already noted in FIGS. 1 through 4, a primary application of the present invention is its use in the downloading of digital content from the Internet. A consumer shops a content distributor's website and selects a piece of content they wish to purchase (music, movies, software, E-books, etc.). The consumer then provides the web site with standard on-line purchase information including the selection's title and method of payment, as well as their physical electronic key information. Transparent to the consumer, the distributor's web site links to the key provider's web site and transmits the physical key information for validation. The key provider's web site then provides the distributor's web site with the information required to prepare the acquired content for secure shipment to the consumer (or notification that the physical key was invalid). The key provider's web site records the transaction for later billing. Finally, the distributor's web site retrieves a copy of the digital content from its library, permanently links it to the consumer's physical key (by using the key's information to encrypt it), and transmits the secured content to the consumer. The consumer is now free to duplicate the content as often as desired, and to play the content on any key-enabled playback device.

Referring to the specifics of FIG. 6, the process of implementing the core acquisition option of downloaded digital content 120 (see FIG. 5) proceeds as follows. At step 130, a receiver/decoder circuit 140 retrieves an account number from a consumer's physical key (transponder) 142 over a secure RF link. At step 131, the consumer enters such data as a password, purchase selection, and method of payment via the consumer's personal computer 144. The data is transmitted to a content distributor's web site 146 from the consumer's personal computer 144. At step 132, the content distributor's web site 146 transmits the account number and password to a key provider's web site 148. At step 133, the key provider's web site 148 authenticates all data against its database 150 and, if authentic, returns such information as the account number, user label, number of users, and software encryption key to the distributor's web site 146. If the data is not valid, the key provider's web site 148 sends a message to the distributor's web site 146 indicating the same. A counter, used for the key provider's billing purposes, is incremented. At step 134, the distributor's web site 146 pulls the purchased content file from its database 152, encrypts it with the software encryption key it received in step 133, and builds a final key-secured content file that is then transmitted to the consumer's personal computer 144. Charges are assessed based on the number of users, etc. and billed to the consumer according to the method of payment. At step 135, invoices 154 are generated and sent to content distributors by the key provider's web site 148 on a regular cycle.

Optionally, to enable content providers to offer sample content (e.g., limiting playback to the device on which the content was originally downloaded, for a specified period of time) a special "enhanced" version of a receiver/decoder circuit 140 can be produced. These enhanced receiver/decoder circuits (primarily for PC's) would each include a unique identification number and additional functionality enabling them to "talk" to a key provider's web site 148 to acquire secured timing information. Sample content files may include the following information (in their encrypted header section):

identification number of enhanced receiver/decoder circuit used for downloading and transmitted by the receiver/decoder circuit to the key provider's web site at the time of content purchase;

hour stamp (i.e., the hour in which the content was downloaded; and life hours (i.e., number of hours content remains valid, such as perpetual, one hour, 24 hours, 48 hours, etc.).

The above information is used by an "enhanced" receiver/decoder circuit during playback to determine whether a content file has "expired" or is attempting to play on an unauthorized device (i.e., any device except the device on which the content was originally downloaded). This capability allows content distributor web sites to distribute limited-use samples with associated tiered-pricing models.

Figure 7:
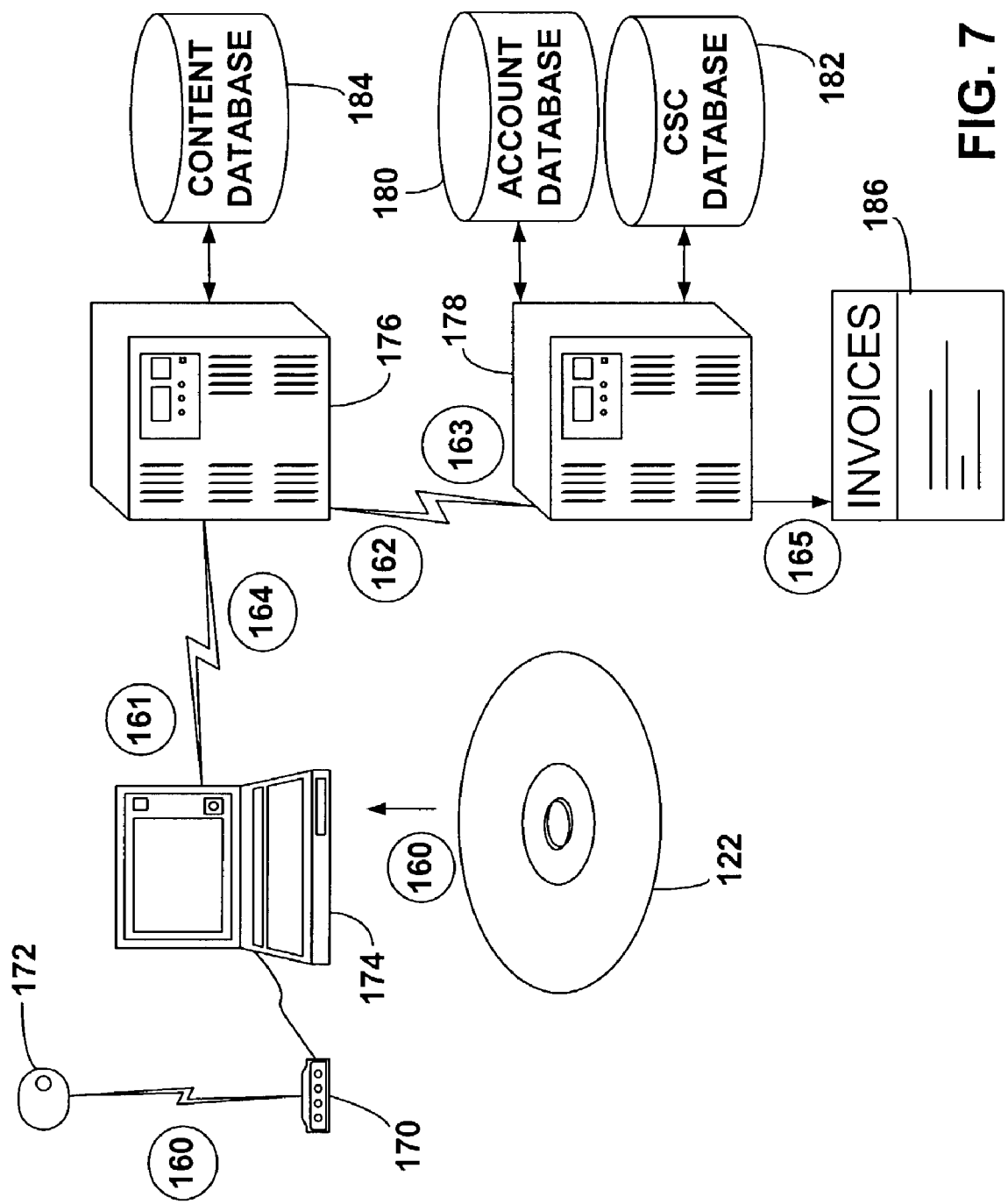
FIG. 7 is a block diagram for implementing a core acquisition option of store-bought content.

Referring to FIG. 7 generally, the present invention can be extended to store-bought content. To fully integrate store-bought content into the present invention, traditional store-bought content is modified in two ways. First, the content is distributed in a copy protected format (e.g., using any valid copy protection technology). Second, the content contains a unique content serial code. The content serial code may be contained either directly in the digital content or as a physical label. Each content serial code is designated by a content distributor during manufacturing and stored in the key provider's database. This database is later used to validate that each content serial code is unique and used only a prescribed number of times. To a consumer, a content serial code on their newly purchased store-bought content represents a download of a key-secured version of that content for free or a prescribed price. This key-secured copy provides the consumer with exactly the same advantages and freedoms as any other key-secured content. From the consumer's standpoint, the download process occurs exactly as any other standard key-secured content download with the exception of how the payment is handled. The "payment" is the content serial code. By providing all of the advantages of the present invention to consumers of legacy-capable store-bought content (by way of "content serial code downloads"), the scheme provides the industry with the first complete DRM solution.

Referring to the specifics of FIG. 7, the process of implementing the core acquisition option of store-bought digital content 122 (see FIG. 5) proceeds as follows. At step 160, a receiver/decoder circuit 170 retrieves an account number from a consumer's physical key (transponder) 172 over a secure RF link, and the consumer's personal computer 174 reads a content serial code from the store-bought content 122. The store-bought content 122 contains the content serial code that uniquely identifies the content. The format of the content serial code may, for example, be PPPP.FFF.0123456789 where PPPP is a provider identification, FFF is a facility identification, and the numbers represent a sequence number. The store-bought content 122 incorporates a copy protection scheme such as Macrovision™, key2audio™, or SafeAudio™. Disc "copy flags" (specified in SDMI standards) may also be set to further inhibit duplication efforts.

At step 161, the consumer enters such data as a password and purchase selection via the consumer's personal computer 174. The previously-read content serial code specifies that the method of payment is to a "content serial code—credit" (i.e., there is typically no charge for this download because the content serial code confirms that the download in process is of content that the consumer has already legitimately purchased). The data is transmitted to a content distributor's web site 176 from the consumer's personal computer 174. At step 162, the distributor's web site 176 transmits the content serial code, account number, and password to a key provider's web site 178. At step 163, the key provider's web site 178 authenticates all data against its databases 180 and 182 and, if authentic, returns such information as the account number, user label, number of users, software encryption key, and paid-flag (indicating the content serial code has been validated) to the distributor's web site 176. The key provider's web site 178 now sets the paid-flag to disable any further downloads and records the account number field in the content serial code database 182 for auditing purposes. If the data is not valid, the key provider's web site 178 sends a message to the distributor's web site 176 indicating the same. A counter, used for the key provider's billing purposes, is incremented. Each entry in the content serial code database 182 may include the following data fields: CDC #, paid-flag, and account number. At step 164, the distributor's web site 176 pulls the content file from its database 184, encrypts it with the software encryption key it received in step 163, and builds a final key-secured file that is then transmitted to the consumer's personal computer 174. No charge is typically assessed because a valid content serial code serves as "payment" for the download. At step 165, invoices 186 are generated and sent to content distributors by the key provider's web site 178 on a regular cycle.

Figure 8:
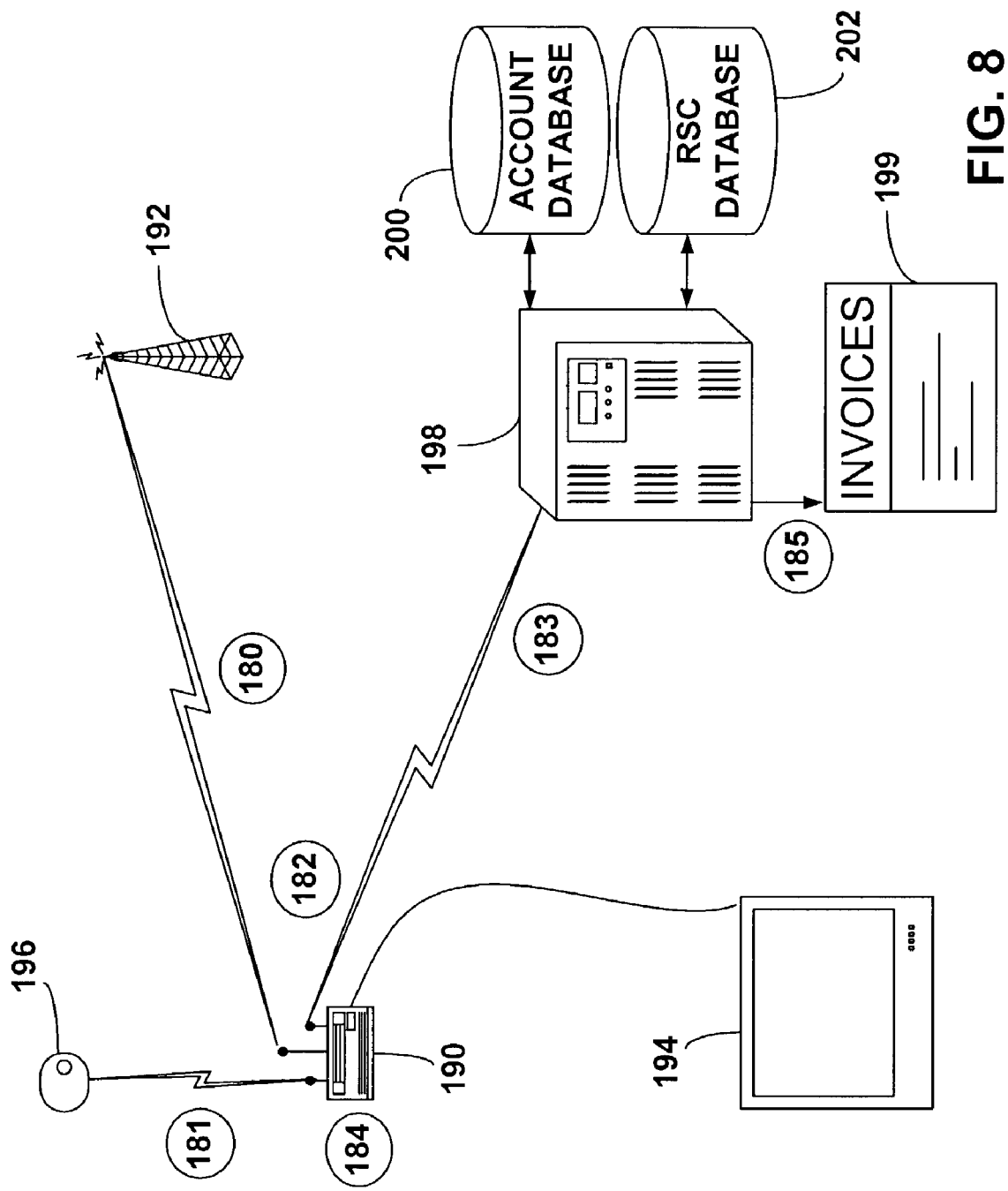
FIG. 8 is a block diagram for implementing a core acquisition option of broadcast content.

Referring to FIG. 8 generally, the present invention can be extended to broadcast content. To fully integrate broadcast content into the present invention, traditional broadcast content is only minimally modified. The modification is that the broadcast content is transmitted in a copy protected format (such as the DVD standard known as Content Scramble System (CSS)). The remainder of the process is described below. A key-enabled recording device, incorporating a unique identifier, receives copy-protected broadcast content. If only playback of the broadcast content is desired, basic decoding (e.g., CSS) is performed and the broadcast content is sent on for playback. If the consumer wishes to record the broadcast content, however, the recording device performs additional steps prior to sending the broadcast content on for playback. The recording device connects to the key provider's web site to validate the recording device's internal identifier and the consumer's physical key. If both are valid, the recording device translates the broadcast content into a key-secured format by encoding it with the consumer's activation code, and then stores the key-secured content file, with its identifier permanently embedded within, for later use. The end result is key-secured broadcast content that provides the owner of the associated physical key all the freedoms and advantages of the present invention. Although the content was originally broadcast, it cannot be illegally copied or distributed. The present invention can be applied to pay per view offerings, as well as standard broadcast material.

Referring to the specifics of FIG. 8, the process of implementing the core acquisition option of broadcast digital content 124 (see FIG. 5) proceeds as follows. At step 180, a receiver/translator/recording device 190 receives digitally broadcast content in copy-protected format from a source 192 such as satellite, cable, Internet, or over-air. The broadcast content may be copy-protected using a copy-protection technology such as an enhanced CSS scheme. If a consumer wishes to only play (not record) the broadcast content, basic decoding (e.g., CSS decoding) is performed and the broadcast content is passed through to presentation device 194 for playback. The remaining steps below may be skipped.

If, however, the consumer wishes to record the broadcast content, the following additional steps are performed prior to sending the broadcast content on for playback. At step 181, the receiver/translator/recording device 190 retrieves an account number from the consumer's physical key (transponder) 196 over a secure RF link. At step 182, the receiver/translator/recording device 190 transmits the account number and its recorder serial code to a key provider's web site 198.

Each device 190 contains a recorder serial code that uniquely identifies the device. The format of the recorder serial code may, for example, be MMMM.FFF.0123456789 where MMMM is a manufacturer identification, FFF is a facility identification, and the numbers represent a sequence number. At step 183, the key provider's web site 198 authenticates the data against its databases 200 and 202 and returns an "approved" or "rejected" response. A counter, used for the key provider's billing purposes, is incremented. At step 184, if a "rejected" response is received, the broadcast content cannot be recorded. If an "approved" response is received, the receiver/translator/recording device 190 translates the decoded content into a key-secured format by encoding it with the consumer's activation code, and records the key-secured content, with the recorder serial code permanently embedded within, to a storage device (that can optionally be an external device). The broadcast content can now be copied to and played back on any key-enabled playback device. At step 185, invoices 199 are generated and sent to content distributors by the key provider's web site 198 on a regular cycle. While providing excellent additional security and protections, steps 182 and 183 are not mandatory for the present invention to function with broadcast content. It may be desirable, for cost purposes, to produce receiver/translator/recording devices 190 not capable of communicating with the key provider's web site 198.

Figure 9A:
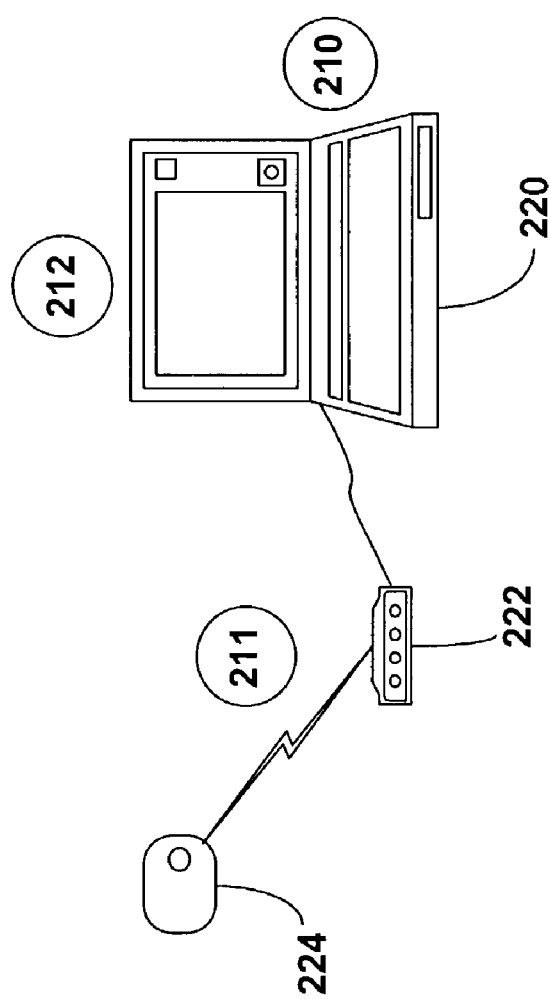
FIGS. 9a and 9b are block diagrams for implementing a core playback option of stand-alone devices.
Figure 9B:
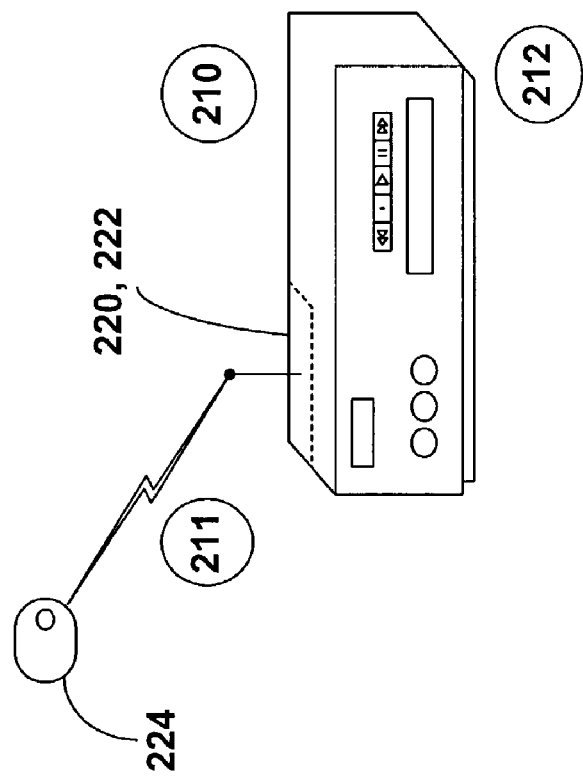

Referring to FIGS. 9a and 9b generally, having acquired key-secured digital content and produced copies for playback on various devices such as a portable CD player, personal computer, home theater, etc., a consumer is now ready to use the digital content. Playback of key-secured content occurs as follows. A key-enabled playback device transparently reads information from a consumer's physical key and from the content file the consumer has requested to play. The pieces of information are then compared to validate that the physical key "matches" the content to be played. If the elements match, the device begins playback of the content. If the elements do not match, the device will not play the content and, depending upon the device's capabilities, may display an "invalid content" message. From a consumer's point of view, when used with legitimately-acquired content, the process is entirely transparent, effortless, and non-intrusive. The consumer is free to use their content on any key-enabled playback device, with the only restriction being that the content can be played only when the associated physical key is present. As noted above, the present invention gives consumers unprecedented freedoms and conveniences to use legitimately purchased content while still fully protecting content providers' rights.

Referring to the specifics of FIGS. 9a and 9b, the process of implementing the core playback option of stand-alone devices 126 (see FIG. 5) proceeds as follows. At step 210, a consumer requests playback of a key-secured content file via a playback device 220. The playback device 220 may, for example, be the consumer's personal computer (FIG. 9a) or a stereo amplifier (FIG. 9b) with integrated compact disc reader/player. At step 211, a receiver/decoder circuit 222 searches for a physical key (transponder) 224. The circuit 222 may be a separate component from the playback device 220 as in FIG. 9a or integrated into the playback device 220 as in FIG. 9b. If the physical key is not found, the playback device 220 displays an "invalid content" message. If the physical key is found, the receiver/decoder circuit 222 retrieves all available information from the physical key 224 over a secure RF link. At step 212, the user labels in the physical key 224 and the key-secured content file are compared. If the user labels do not match, the playback device 220 displays an "invalid"

message. If the user labels do match, the receiver/decoder circuit 222 retrieves the software decryption key from the physical key 224 over the secure RF link between the physical key 224 and the playback device 220 and begins decryption of the encrypted portion of key-secured file. When the account number is decrypted, it is matched against the account number retrieved from the physical key 224. If the account numbers do not match, the playback device 220 displays an "invalid content" message. If the account numbers do match, the software decryption key is used by the playback device 220 to decrypt remaining data in the key-secured file for playback. The user label and the account number in the physical key serve as a first activation code, and the user label and the account number in the content file serve as a second activation code. These activation codes must match (or have some other predetermined association) in order for playback to proceed.

Figure 10:
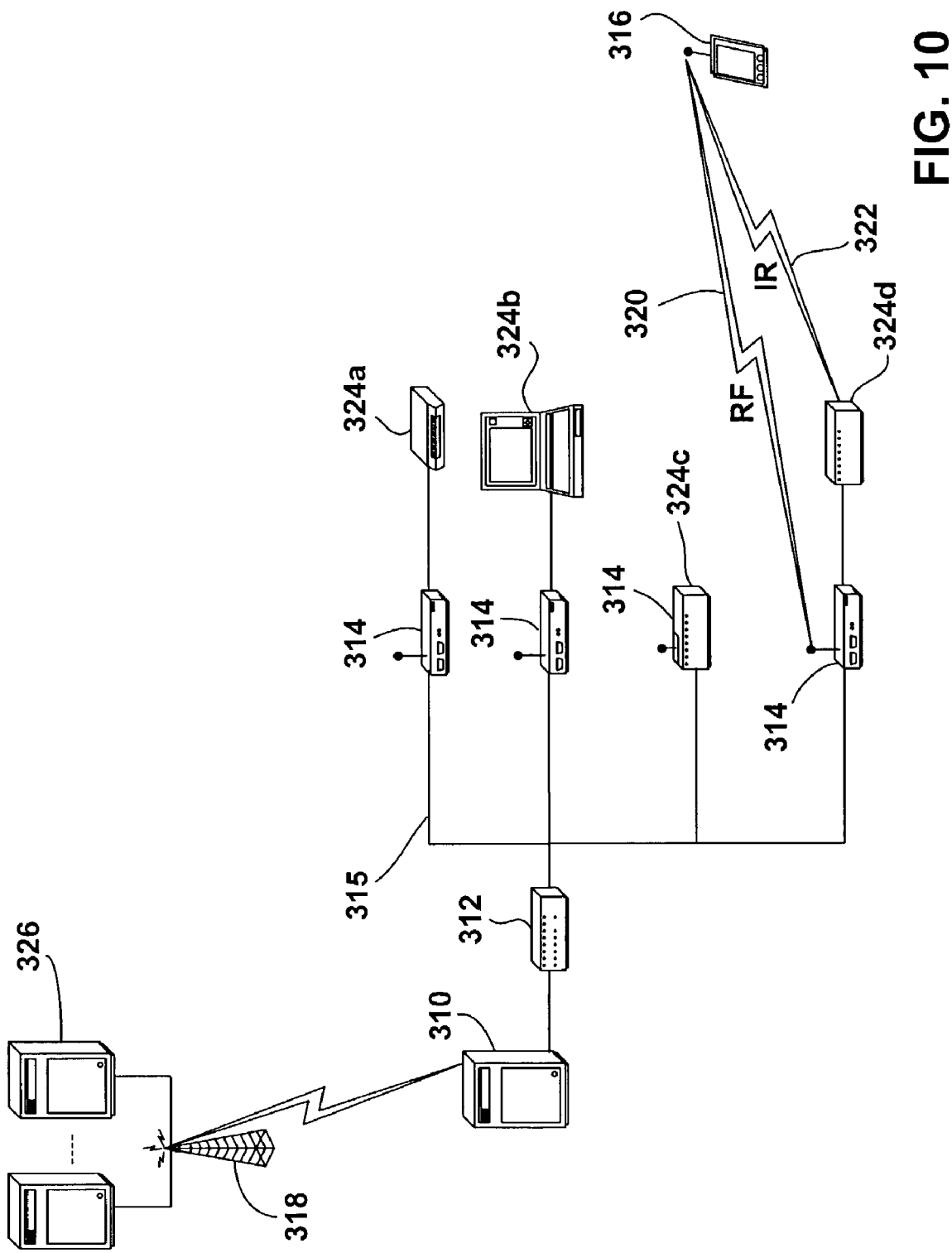
FIG. 10 is a block diagram for implementing a core playback option of networked devices.

Referring to FIG. 10 generally, while stand-alone playback devices (e.g., CD players, PCs, DVD players, etc.) are currently the norm, the convergence of these devices and the Internet will lead to an environment where centralized digital distribution systems proliferate. Security of content in these environments is critical yet challenging to accomplish without imposing great restrictions. The present invention can provide security to a centralized digital distribution system and, in addition, offers many important enhancements that greatly increase the convenience and usability of such a system. These enhancements include integration of the physical key into a portable hand-held computer which then doubles as the system remote. In addition to controlling all networked components, the remote is used for tasks such as purchasing content from the Internet, and tracking the movement of a user throughout a facility to provide automatic "content following" (i.e., where content playback follows the user from room to room). The centralized nature of the digital content distribution system means that only one storage device is required to maintain a consumer's entire digital content library (e.g., music, movies, software, E-books, etc.) and to feed that content to any networked playback device.

Referring to the specifics of FIG. 10, there is shown a centralized digital content distribution system for implementing the core playback option of networked devices 128 (see FIG. 5). The system is used in an establishment such as a residence or entertainment facility. The system includes a digital content server 310, a distribution hub 312, a plurality of remote clients 314, and a portable remote control 316. The digital content server 310 stores digital content acquired from a source 318 such as satellite, cable, Internet, or over-air. In addition, the digital content server 310 may store digital content uploaded from a standard component 324. The plurality of remote clients 314 are located in different rooms of the establishment and linked to the digital content server 310 via the distribution hub 312 or switch. The remote clients 314 are linked to the distribution hub 312 by a backbone transmission network 315. The backbone transmission network 315 may be wireless or wired with fiber optic cables, coaxial cables, or twisted pair cables, may employ a networking protocol such as Ethernet, Wi-Fi, Arcnet, or ATM (Asynchronous Transfer Mode), and may employ a communications protocol such as TCP/IP. Each remote client 314 includes a network interface card (NIC) for interfacing with the backbone transmission network 315.

The remote control 316 is adapted to communicate with each of the remote clients 314 and select the digital content stored in the digital content server 310. The remote control 316 is essentially a personal digital assistant (i.e., hand-held computer) including a display and added remote control circuitry. The display may, for example, be a liquid crystal display (LCD). The added remote control circuitry includes "system remote" circuitry and "universal remote" circuitry.

The "system remote" circuitry in the remote control 316 is for establishing a first wireless transmission link 320 with each of the remote clients 314. The first wireless transmission link 320 may be a secure radio link (RF) as shown or an infrared link (IR). Upon establishing the first wireless transmission link 320 with one of the remote clients 314, the remote control 316 serves as a system remote capable of (1) displaying, scanning, and selecting the digital content available on the digital content server 310 and downloading the selected digital content from the digital content server 310 to the linked remote client 314 and (2) controlling the digital content server 310 to acquire or download digital content from a source 318 such as satellite, cable, Internet, or over-air. As used herein, the term "download" and similar variations thereof (e.g., downloaded, downloading, etc.) is intended to cover the transfer of content from one device to a receiving device whether the content is stored on the receiving device or merely "streamed" to the receiving device for immediate playback. The remote control 316 preferably includes a display for displaying the digital content. The display may, for example, be a liquid crystal display (LCD). As a user holding the remote control 316 moves from room to room of the establishment, the remote control 316 successively establishes wireless transmission links 320 with the remote clients 314 in the respective rooms. In this way, the digital content available on the digital content server 310 follows the user's movement from room to room.

In a preferred embodiment, the first wireless transmission link 320 is a secure radio link established by matching transceivers in the remote control 316 and each remote client 314. The matching transceivers are preferably small, inexpensive Bluetooth™ radio chips that operate in the unlicensed ISM band at 2.4 GHz and avoid interference from other signals by hopping to a new frequency after transmitting or receiving a packet. The radio chips are integrated into the respective remote control 316 and each remote client 314, which can then communicate over short distances and through obstacles by means of radio waves. Wireless technologies other than Bluetooth, such as Wi-Fi, may be used to communicate remote control signals between the remote control 316 and each remote client 314.

The "universal remote" circuitry in the remote control 316 is for establishing a second wireless transmission link 322 with standard components 324 connected to the remote clients 314. The second wireless transmission link 322 is preferably an infrared link (IR) as shown. Upon establishing the second wireless transmission link 322 with one of the standard components 324, the remote control 316 serves as a universal remote capable of operating the standard component 324. The standard component 324 may, for example, be an audio receiver (stereo amplifier), an audiovisual receiver, a video monitor (television), etc. The standard components 324 may be physically separate from, but linked to, the respective remote clients 314 or may be physically integrated into the respective remote clients 314 like integrated device 324c.

The digital content stored on the digital content server 310 may be formatted as a compact disc (CD), digital video disc (DVD), MP3, electronic book, software, etc. When the remote control 316 is linked to one of the remote clients 314, a user may scan and select digital content to be downloaded from the digital content server 310 to the remote client 314 and converted by the remote client 314 to a standard playable format (e.g., analog format) that can be played on the associated standard component 324. The selected digital content is downloaded from the digital content server 310 to the remote client 314 as raw digital data packets. The remote client 314, in turn, converts the downloaded digital content to a standard component output(s) compatible with a standard component 324 connected to the remote client 314, and the standard component 324 plays the digital content. Ports may, for example, include S-Video, RCA jacks, serial ports, Universal Serial Bus, Ethernet, Wi-Fi, Firewire™, Bluetooth, RF, or other similar outputs. The standard component 324 incorporates, or is linked to, audio speakers for broadcasting any audio signals received from the remote client 314 and a video monitor for displaying any video signals received from the remote client 314.

All content is stored on the digital content server 310 digitally, and is key-secured if obtained via the download or broadcast acquisition options of FIGS. 6 and 8. If the digital content is key-secured, the plurality of remote clients 314 include decryption circuitry (i.e., receiver/decoder circuit) for unlocking the digital content. The digital content selected for download from the digital content server 310 to a remote client 314 preferably remains encrypted until converted to a standard component output(s) in the remote client 314. The remote client 314 acts as a converter between key-secured digital content from the digital content server 310 and the standard component output(s). To decrypt the selected digital content, the remote control 316 contains a physical key initially acquired from a key provider in accordance with the present invention. The digital content is initially acquired from a content provider 326 that marks the digital content with an activation code associated with the physical key. The decryption circuitry in the remote client 314 receives an activation code from the remote control 316 via the wireless transmission link 320 and is enabled to unlock and convert the digital content to a playable format if the activation code in the remote control 316 is associated with the activation code in the digital content. If the activation code in the remote control 316 is not associated with the activation code in the digital content, the remote client 314 will not unlock and convert the digital content.

In an alternative embodiment, the remote clients 314 are eliminated and the standard components 324 are linked directly to standard component outputs of the distribution hub 312 by the backbone transmission network 315. In this case, the distribution hub 312 serves as a switch, and the digital content server 310 contains the decryption circuitry for unlocking the digital content. As the digital content is decrypted, it is converted to a playable format and fed to the distribution switch 312 for delivery to the appropriate standard component 324. The decryption circuitry in the digital content server 310 receives the activation code from the remote control 316 and is only enabled to unlock and convert the digital content to a playable format if the activation code in the remote control 316 is associated with the activation code in the digital content.

Instead of decrypting the digital content so that it can be played, the digital content may be downloaded (or "passed through") in its encrypted format to a storage device such as a media burner 324a or computer hard disk 324b for storage thereon. When a user ultimately desires to play the stored digital content on a media player, the media player must contain the decryption circuitry for unlocking the digital content. After unlocking the digital content, the media player converts the unlocked digital content to a playable format and plays the digital content. The decryption circuitry in the media player receives the activation code from the remote control 316 or physical key with the same activation code. The media player is only enabled to unlock and convert the digital content to a playable format if the activation code in the remote control 316 or physical key is associated with the activation code in the digital content.

In addition to downloading selected digital content from the digital content server 310 to the remote clients 314, data (e.g., MP3, CD, DVD, software, etc.) from the standard components 324 can be uploaded to the digital content server 310 and stored digitally thereon. This allows for storage of legacy content on the digital content server 310.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

The invention claimed is:

1. A digital rights management system, comprising:
    a physical electronic key arranged to wirelessly transmit a first activation code, the first activation code being provided by, fixedly stored on and unique to the physical electronic key;
    a web site receiving a request for digital content and the first activation code from a user's computer;
    a content provider receiving the request for digital content and the first activation code from the website, generating a second activation code based on the first activation code, encoding the requested digital content with the second activation code, and outputting the digital content encoded with the second activation code; and
    a playing device including a transceiver for wirelessly receiving the first activation code from the physical electronic key, and for receiving the digital content encoded with the second activation code, wherein the playing device verifies that the second activation code was generated based on the first activation code from the physical electronic key, and plays the digital content responsive to verifying an association between the first activation code and the second activation code.

2. The digital rights management system of claim 1, wherein the playing device is further arranged to receive the digital content from a global computer network.

3. The digital rights management system of claim 1, wherein the physical electronic key is arranged to wirelessly transmit the first activation code based on at least one of wireless fidelity technology, radio frequency technology, and infrared technology.

4. The digital rights management system of claim 1, wherein the playing device comprises at least one of a personal computer, an MP3 player, a DVD player, a CD player, a cellular phone, and a portable computing device.

5. The digital rights management system of claim 1, wherein the physical electronic key includes a software decryption key, and wherein the digital content is secured with a software encryption key associated with the software decryption key.

6. The digital rights management system of claim 1, further comprising:
    a database remote from the playing device and arranged to store the second activation code.

7. The system of claim 1, wherein the playing device further stops playing the digital content responsive to the physical key moving out of range of the playing device.

8. The system of claim 1, wherein the playing device compares the first activation code to the second activation code responsive to the user pressing a play button on the playing device.

9. A method for digital rights management, comprising:

receiving by a wireless detector, a first activation code wirelessly transmitted from a physical electronic key, the first activation code unique to and fixedly stored on the physical electronic key;

transmitting the first activation code together with a request for digital content to a content provider, wherein the content provider generates a second activation code based on the first activation code responsive to receiving the first activation code and the request for digital content, and encrypts the requested digital content with the second activation code;

receiving the digital content encrypted with the second activation code from the content provider;

responsive to receiving a request to play the encrypted digital content, wirelessly receiving the first activation code from the physical electronic key;

reading the second activation code from the encrypted digital content;

comparing the first activation code and the second activation code to verify that the second activation code was generated based on the first activation code from the physical electronic key; and decrypting and playing the digital content dependent on responsive to verifying that the first activation code is associated with the second activation code.

10. The method of claim 9, wherein receiving the digital content encrypted with the second activation code comprises at least one of:

downloading the digital content from a global computer network;

receiving the digital content as stored on a physical store-bought medium; and receiving the digital content as broadcast.

11. The method of claim 9, further comprising:

recording the digital content prior to the decrypting and playing the digital content.

12. The method of claim 9, wherein the content provider embeds a device code in the recorded digital content, the device code being the second activation code.

13. The method of claim 9, wherein the content provider applies timing information with the digital content that limits use of the digital content to a prescribed time period.

14. The method of claim 9, wherein the content provider applies device information to the digital content that limits use of the digital content to an authorized device.

15. The method of claim 9, wherein the content provider prevented from providing additional versions of the digital content in response to providing the digital content.

16. The method of claim 9, wherein the content provider provides the digital content for a predetermined number of times.

17. The method of claim 9, wherein the content provider validates at least one of the physical electronic key and the first activation code prior to providing the digital content.

18. The method of claim 9, wherein the digital content is stored on a physical medium.

* * * * *

UNITED STATES PATENT AND TRADEMARK OFFICE
CERTIFICATE OF CORRECTION

PATENT NO. : 7,472,280 B2
APPLICATION NO. : 10/153979
DATED : December 30, 2008
INVENTOR(S) : John J. Giobbi It is certified that error appears in the above-identified patent and that said Letters Patent is hereby corrected as shown below:

Column 15, line 28, after "decrypting and playing the digital content" delete "dependent on".

Column 16, line 13, after "embeds a device code in the" delete "recorded".

Column 16, line 21, after ", wherein the content provider" insert --is--.

Signed and Sealed this

Seventeenth Day of March, 2009

JOHN DOLL
*Acting Director of the United States Patent and Trademark Office*